United States Patent Office.

SAMUEL MELSOM, OF ERIE, PENNSYLVANIA.

Letters Patent No. 64,125, dated April 23, 1867.

IMPROVED PAINT OIL.

*The Schedule referred to in these Letters Patent and making part of the same.*

TO ALL WHOM IT MAY CONCERN:

Be it known that I, SAMUEL MELSOM, of Erie, in the county of Erie, and State of Pennsylvania, have invented a new and useful composition of matter to be used as Paint Oil; and I do hereby declare that the foling is a full and exact description thereof.

The ingredients are linseed oil, painter's benzine, rosin, and japan dryer.

The proportions are as follows, viz: twenty-two gallons of boiled linseed oil, sixteen gallons of painter's benzine, fifty-six pounds of rosin, of any grade or quality, and three gallons of japan dryer. Different quantities of each are used in this proportion.

The mode of manufacturing is as follows, viz: Dissolve the rosin by gentle heat in eleven gallons of the oil, bring the mixture to the boiling point, and while boiling pour in the remainder of the oil, then draw it off into a tank, or remove it from the fire, and add the dryer and benzine while stirring the same. Let it stand twenty-four hours to settle and it is ready for use.

Instead of boiled oil the raw linseed oil may be used. Instead of the japan dryer there may be used an equivalent of white copperas, or magnesia, or other paint dryer.

What I claim as my invention, and desire to secure by Letters Patent, is—

The paint oil, composed of linseed oil, benzine, rosin, and the paint dryer in the proportions substantially as set forth, and prepared as described.

SAMUEL MELSOM.

Witnesses:
J. W. WITMON,
E. CAMPHAUSEN.